Oct. 11, 1960 E. STUMP 2,955,842

AXLE SUSPENSION FOR VEHICLES

Filed May 10, 1957 4 Sheets-Sheet 1

INVENTOR
EUGEN STUMP

BY Dicke and Craig.
ATTORNEYS

Oct. 11, 1960 E. STUMP 2,955,842

AXLE SUSPENSION FOR VEHICLES

Filed May 10, 1957 4 Sheets-Sheet 2

INVENTOR
EUGEN STUMP

BY *Dicke and Craig.*

ATTORNEYS

Oct. 11, 1960 E. STUMP 2,955,842

AXLE SUSPENSION FOR VEHICLES

Filed May 10, 1957 4 Sheets-Sheet 3

INVENTOR
EUGEN STUMP

BY Dicke and Craig

ATTORNEYS

Oct. 11, 1960 E. STUMP 2,955,842

AXLE SUSPENSION FOR VEHICLES

Filed May 10, 1957 4 Sheets-Sheet 4

INVENTOR
EUGEN STUMP

BY Dicke and Gray

ATTORNEYS 2,955,842
Patented Oct. 11, 1960

2,955,842

AXLE SUSPENSION FOR VEHICLES

Eugen Stump, Stuttgart-Unterturkheim, Germany, assignor to Daimler-Benz Aktiengesellschaft, Stuttgart-Unterturkheim, Germany Filed May 10, 1957, Ser. No. 658,400
Claims priority, application Germany May 11, 1956
24 Claims. (Cl. 280—124)

The present invention relates to an axle suspension for motor vehicles, particularly large type vehicles such as buses or the like.

The present invention consists to a considerable degree in that the wheel axle, which is constructed as a rigid axle, is spring-suspended on the vehicle superstructure by coil springs or correspondingly arranged non-guiding springs and is pivotally connected to the vehicle superstructure by guide links which form a guide quadrangle, as seen in side view, in such a manner that the axle, while being laterally supported against the vehicle superstructure, may swing around a longitudinal axis of the vehicle with respect to the vehicle superstructure.

A direct response of the axle to unevenness in the road may be obtained by such an axle suspension as a result of the use of non-guiding, frictionless coil springs.

In order to enable uneven or unequal movements or strokes of the wheels of an axle, i.e., in order to enable tilting thereof in relation to the vehicle superstructure, a rotational yieldingness or a certain lateral yieldingness is advantageously provided in the pivotal supports or bearings while transverse forces between axle and vehicle superstructure are simultaneously absorbed by a special brace or support arrangement. The latter may consist, as to the front axle in a transverse bracing link, or, as to a rear axle, in that the central guide link thereof, for instance, the upper guide link thereof, is supported on one end thereof in a hinge-like manner on the vehicle superstructure whereas the other end thereof is connected with, for instance, the axle by means of a universal joint.

Such a triangularly-shaped guide link assures an especially stable support and, at the same time, provides the possibility of a relatively elevated pivot point of the vehicle superstructure in relation to the wheel axle whereby tilting of the vehicle body in curves may be kept at a minimum.

On the other hand, the guidance of the wheel axle by means of three longitudinal guide arms or links and of a transverse guide link offers the advantage of lesser influence on the steered-wheels so that such an axle guide arrangement is especially suitable for an axle with steerable wheels.

Furthermore, the three guide links and possibly also the transverse guide link and the pivot or joint means therefor may be made as identical or as essentially identical parts. The guide links are advantageously supported at the frame and axle respectively by the interposition of rubber bumpers whereby the guide link which, for instance, is supported in a hinge-like manner at the forked end thereof, particularly for purposes of ready installation and assembly, is supported at the forked ends thereof by means of inserted pins which themselves are supported at their protruding ends in rubber bushings whereas the other end of this guide link includes a spherical rubber ring or bushing for purposes of providing universal joint, for example, at the axle.

By reason of the normally high load on the rear axle, a preferred embodiment of the invention consists in that the front axle of the vehicle is springingly supported against the vehicle superstructure by a coil spring on each side thereof, possibly with an auxiliary spring disposed on the inside thereof, and in that the rear axle of the vehicle, equipped, for instance, with twin wheels, is springingly supported against the vehicle superstructure by two coil springs on each side of the vehicle. The coil springs of the front axle may thereby be supported, on the one hand, directly against the rigid axle and, on the other hand, against the ends of a transverse frame member whereas for the support of the rear axle by means of two coil springs per vehicle side, a scale-beam-like, bow-shaped support member is provided which crosses the wheel axle and is connected therewith and which, by means of the bow-shaped portion thereof, extends around the wheels, the ends of the bow-shaped support member serving as abutment or bearing surface for the coil springs. The abutment or bearing points may, therefore, be moved up to the plane of rotation of wheels or closely thereto in front and to the rear of the wheels so that a broad support base is obtained between the vehicle superstructure and the axle in a transverse direction of the vehicle.

The driving aggregate which advantageously drives the rear axle is preferably arranged between the front and the rear axle, and more particularly is arranged at about the center of gravity of the loaded vehicle.

Accordingly, it is an object of the present invention to provide an axle suspension arrangement for vehicles, particularly for large vehicles with rigid axles which assures good spring characteristics.

It is another object of the present invention to provide an axle suspension for vehicles including rigid axles suspended from the superstructure by means of non-guiding coil spring which results in an arrangement in which the transmission of road shocks from the wheels to the superstructure of the vehicle is kept to a minimum.

Another object of the present invention is to provide an axle suspension in which direct response of the axle to unevenness in the road is attained to a very high degree.

It is another object of the present invention to provide an axle suspension for large types of vehicles with rigid axles which prevents a change in tread as the wheels move upwardly and downwardly during travel of the vehicle.

Still another object of the present invention resides in the provision of an essentially quadrangular guide link arrangement by means of which the axles are guided essentially in parallel during equal up and down movements thereof.

It is a further object of the present invention to provide an axle suspension, particularly for rigid axles used in connection with large vehicles, which enables inclination of the rigid axle with respect to the vehicle superstructure and which provides specially constructed bearing joint means to render possible such inclination.

A further object of the present invention resides in the provision of a wheel suspension for rigid axles of large vehicles in which the springs do not perform any guiding function and which, nevertheles, assure appropriate absorption of lateral forces or thrusts against the suspension.

Another object of the present invention is the provision of a wheel suspension for rigid axles which guarantees a stable support of the vehicle to minimize inclinations when traversing curves.

Still a further object of the present invention is to provide a spring suspension for rigid axles supporting steerable wheels which minimizes the influence on the steering action.

Another object of the present invention resides in the provision and arrangement of a wheel suspension which facilitates assembly thereof even when such assembly is carried out in places normally accessible only with difficulty.

These and further objects, features, and advantages of the present invention will become more obvious from the following description of an axle suspension arrangement in accordance with the present invention when taken in connection with the accompanying drawing which shows, for purposes of illustration only, one preferred embodiment in accordance with the present invention and wherein.

Figure 1:
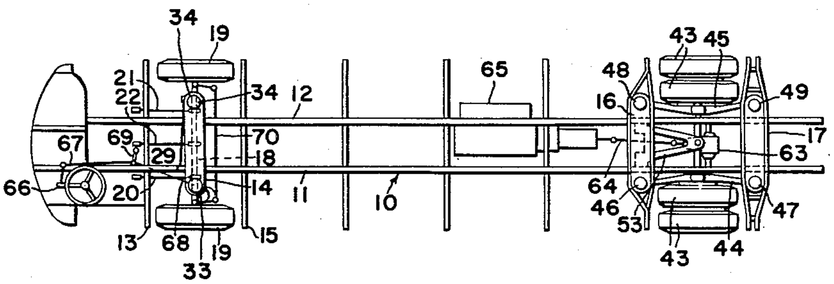
Figure 1 is a schematic overall plan view of the frame of a vehicle, such as a bus, in accordance with the present invention.
Figure 4:
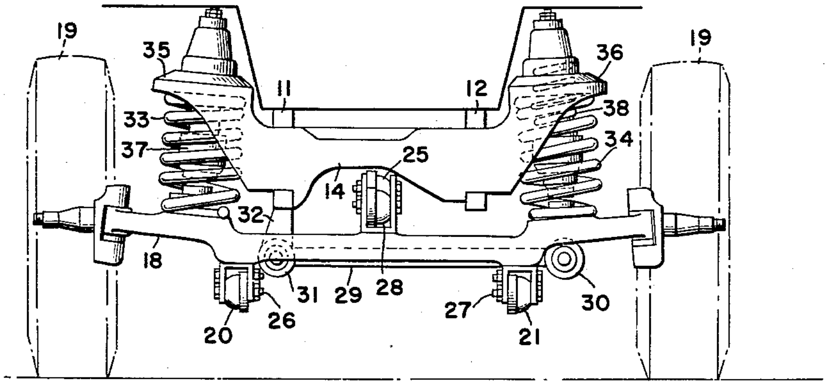
Figure 4 is a cross-sectional view taken along line 4—4 of Figure 2.
Figure 2:
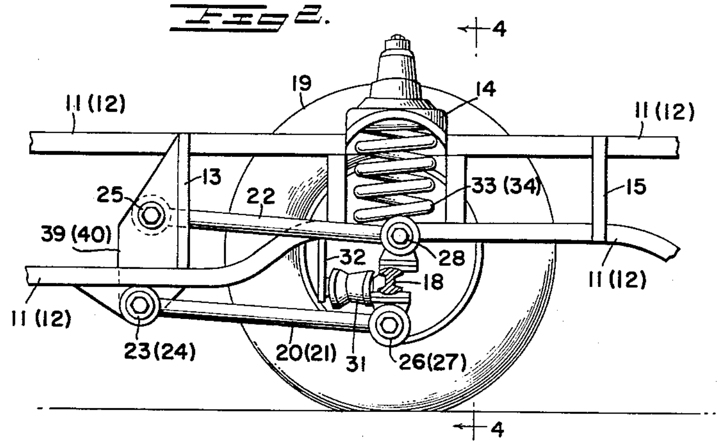
Figure 2 is a side view of the front axle arrangement in cross section taken along line 2—2 of Figure 3.

Referring now to the drawing, wherein like reference numerals are used throughout the various views to designate like parts, and more particularly to Figure 1, reference numeral 10 generally designates the chassis frame which may also be combined, for instance, with the vehicle body or part thereof and which will be referred to hereinafter as the vehicle "superstructure." The chassis frame or superstructure 10 includes, among others, two longitudinal frame members 11 and 12, and the transverse frame members 13, 14 and 15 in the region of the front axle 18 and the transverse frame members 16 and 17 in the region of the rear axle 42.

Figure 3:
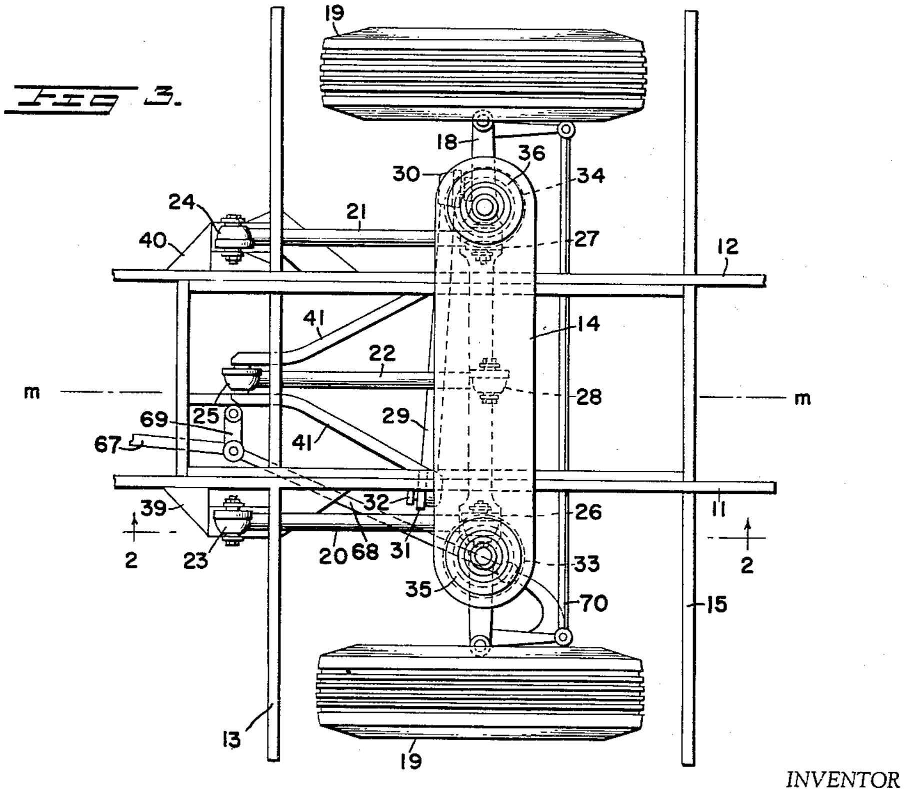
Figure 3 is a top view of the front axle arrangement of Figure 2.
Figure 5:
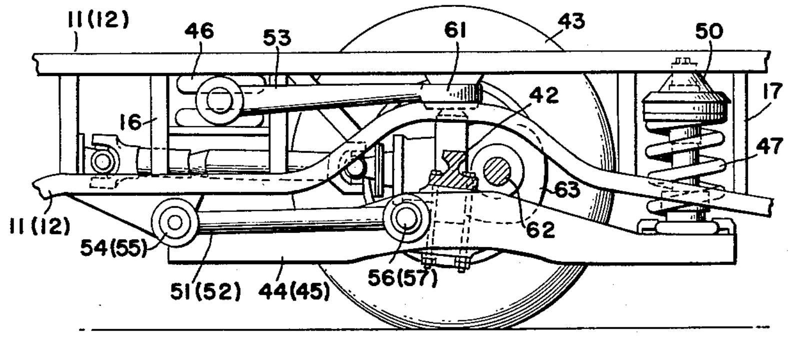
Figure 5 is a side view of the rear axle arrangement in cross section taken along line 5—5 of Figure 6.
Figure 6:
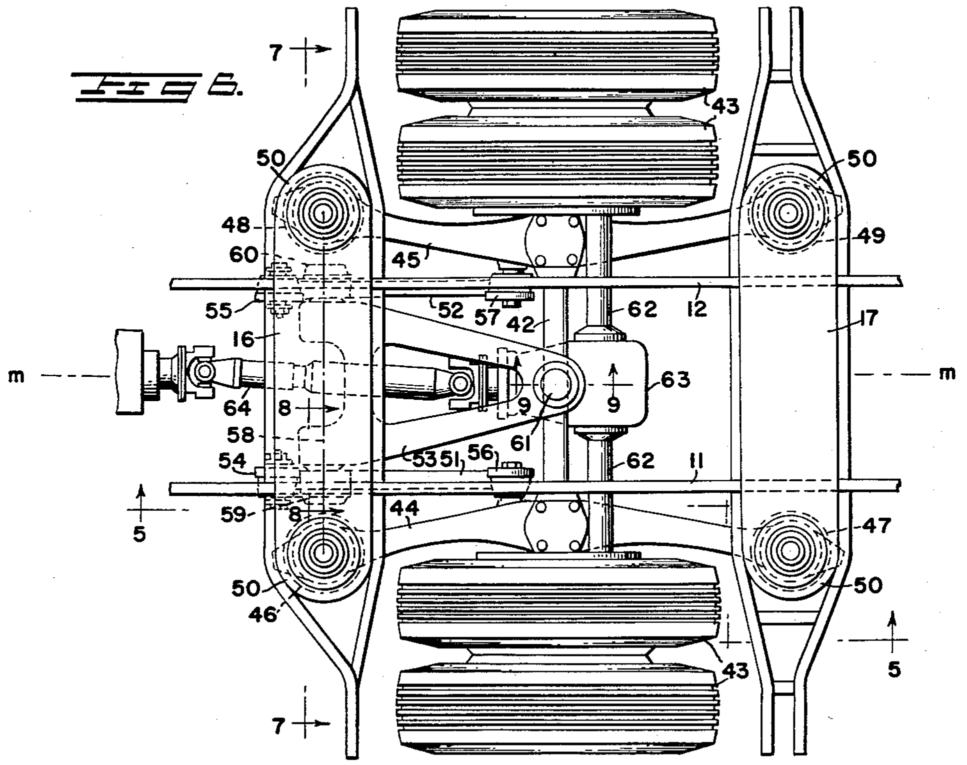
Figure 6 is a top view of the rear axle arrangement of Figure 5.
Figure 7:
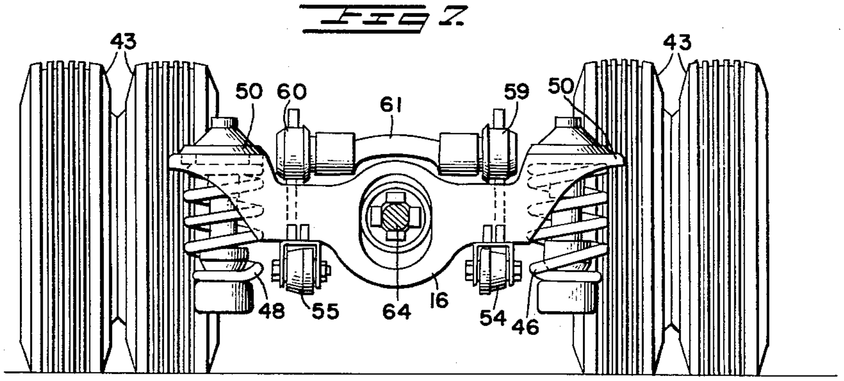
Figure 7 is a cross-sectional view taken along line 7—7 of Figure 6.

The front axle 18 with one steerable side wheel 19 on each side is guided parallelly or essentially parallelly, when viewed from the side, by means of two lateral lower guide links 20 and 21 and an upper guide link 22 whereby the three guide links 20, 21 and 22 are pivotally supported on the chassis or vehicle superstructure 10 at points 23, 24 and 25, respectively, and on the front axle 18 at points 26, 27 and 28, respectively. In order that the axle 18 may be tilted relative to the chassis or vehicle superstructure for purposes of driving over one-sided obstacles, the pivotal supports 23 to 28 are constructed yieldingly to a certain extent, for example, by the insertion of rubber bumpers so that tilting or rotation of the axle 18 in relation to the vehicle body around a vehicle longitudinal axis *m—n* (Figure 3) is rendered possible thereby. Possibly, the guide links 20—22 themselves may also be formed torsionally in themselves. A transverse guide member or support brace 29 is pivotally supported, preferably also yieldingly and in the same manner as guide links 20, 21 and 22, at 30 on the axle and at 31 on a lug 32 fastened to the chassis for purposes of absorbing the transverse forces between the axle 18 and the vehicle superstructure 10. Coil springs 33 and 34 are provided for the spring-suspension of axle 18 whereby coil springs 33 and 34 do not have to absorb the transverse forces occurring between the axle 18 and the vehicle superstructure 10 by reason of the presence of the transverse support or bracing means 29, and which, therefore, operate practically without friction. One coil spring each is provided for each wheel which springs are supported at their lower ends directly against the front axle 18 and at their upper ends against the respective abutment surfaces 35 and 36 formed by the ends of the transverse bearer member 14. An auxiliary spring 38 as well as a shock absorber 37 may be provided on the inside of each of the coil springs 33 and 34.

The laterally arranged guide links 20 and 21 are supported in the region of the transverse support 13 of the frame on appropriately constructed, lug-shaped mounting members 39 and 40, respectively, which are connected with and thereby reinforce with each other the lower and upper girders of the longitudinal members 11 and 12 as well as cross members 13 of the frame. Diagonal support or bearer members 41 which are welded to the longitudinal frame members 11, 12 and to the transverse frame member 13, respectively, and which are extended therebeyond, appropriately serve for purposes journalling the guide link 22 at the superstructure 10.

The rigid rear axle 42 carries, at its ends, twin wheels 43 and is rigidly connected with scale-beam-like support members 44 and 45 which are slightly bow-shaped. Two coil springs 46, 47 and 48, 49, respectively, on each side are provided for spring supporting the rear axle 42. The coil springs 46, 47 and 48, 49, respectively, are supported, on the one hand, at the lower ends thereof on the ends of the bow-shaped support members 44 and 45, respectively, and on the other hand, at the upper ends thereof against the abutment surfaces 50 formed by the ends of the frame transverse members 16 and 17, respectively, which project beyond the longitudinal members, whereby the plane of support of the springs 46, 47, 48 and 49 approaches as closely as possible the plane of movement of the inside wheels of each of the twin wheels 43. Each of the coil springs 46—49 may accommodate in its central part a shock absorber, for instance, a telescopic shock absorber.

The guidance of the rear axle 42 is accomplished, similarly as in the case of the front axle 18, by a guide-link arrangement of the parallelogram-type, i.e., which forms a quadrangular guide link arrangement as viewed in side view and which is swingable about a longitudinal axis of the vehicle. The guide-link arrangement for the rear axle 42 is formed by the two lower guide links 51 and 52 and the upper guide link 53. The lower guide links 51 and 52 are thereby pivotally mounted, by means of joints 54 and 55 at the frame 10 or at the longitudinal frame members 11, 12 in the vicinity of the transverse members 16 and, by means of joints 56 and 57, on the axle 42 or on the support members 44 and 45 thereof. The mounting thereof is preferably of the universal-joint type provided by the insertion of suitable rubber bumpers whereby the guide links for the rear axle 42 may be formed and supported so that they are interchangeably similar with the guide links of the front axle 18.

In contrast to the suspension of the front axle 18, the upper guide link 53 of the rear axle 42 is of triangular configuration and, on the one hand, is supported in a hinge-like manner about a transverse axis 58 in the bearings 59 and 60 arranged at the vehicle frame in the region of transverse bearer 16 so that the lever or link 53 may only swing about axis 58 with respect to the vehicle superstructure. The opposite end of the link 53 is connected with the rear axle 42 by means of a universal joint 61.

Figure 8:
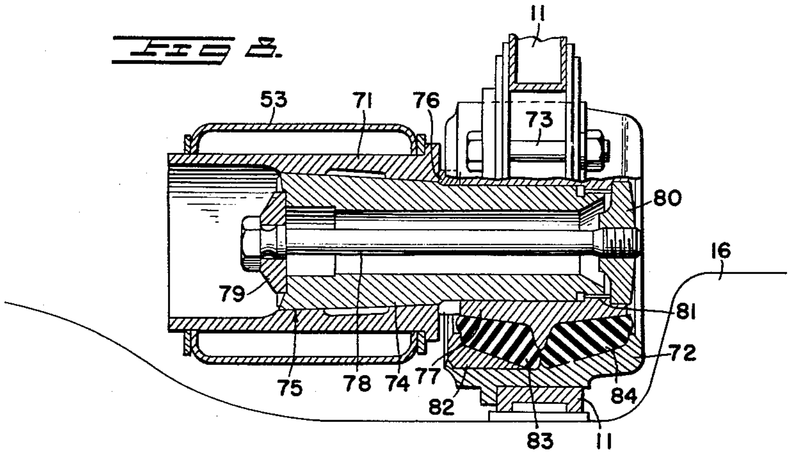
Figure 8 is a cross-sectional view taken along line 8—8 of Figure 6 through one of the hinge joints of the central triangular-shaped guide link or arm.

The pivotal mounting of one fork end of the guide link or lever 53 is shown in cross section in Figure 8. A bushing 71 is inserted into the hollow profile of the guide link 53, preferably is welded in place therein, while an opening of the longitudinal frame member 11 accommodates a bushing 72 which may be fastened, for example, to the longitudinal frame member 11 by means of bolts 73. A pin 74 serves for purposes of establishing a connection which is inserted into the bushing 71 by means of the cone-shaped surface 75 thereof and which is secured in the axial direction with respect to bushing 71 by way of an intermediate ring 76 and a bushing 77 placed over the cylindrical part of the pin 74 by means of tensioning bolt 78 and of end pieces 79 and 80. The bushing 77 is axially slidably coupled with the pin 74 by means of serrations 81 and has the shape of a double cone on the outside thereof. Rubber rings 83 and 84 are inserted between the outside of the bushing 77 and the bushing 72 or a screwed-in ring member 82, respectively. The rubber rings 83 and 84 are formed V-shaped in cross section and arranged in relation to each other so as to form a V, and are kept axially under tension by the ring member 82.

It is possible by this construction of the pivot bearings to support the guide lever or link from above between the longitudinal frame members 11 and 12, and to assemble or introduce only later on the bearing pin 74 as well as possibly also the rubber bumpers 83 and 84 so that assembly may also be carried out at a place which is ordinarily relatively inaccessible.

Figure 9:
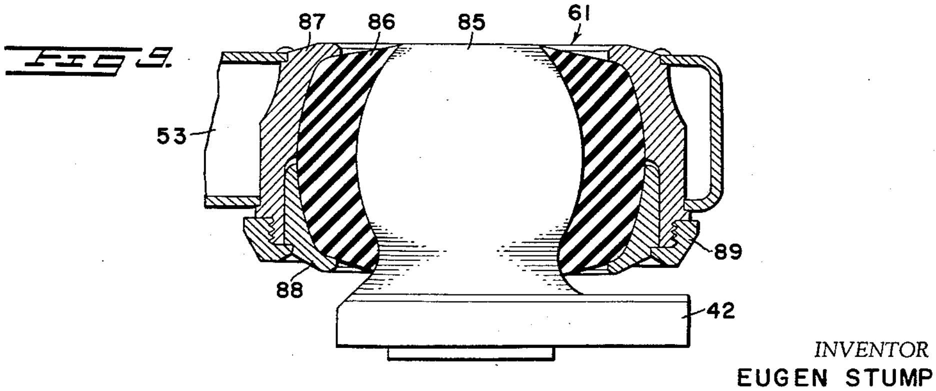
Figure 9 is a cross-sectional view taken along line 9—9 of Figure 6 through the universal joint of the same central guide link.

The pivot arrangement or joint which connects the guide link or lever 53 with the rear axle 42 is shown, for example, in Figure 9. For this purpose, the axle 42 is provided with a ball-shaped pin 85 which is surrounded by a rubber bushing 86 spherically shaped both on the inside as well as on the outside thereof. At the outside thereof the rubber bushing 86 is inserted into the socket-like bearing head 87 of link 53, which socket-like head 87 is also spherically shaped on the inside thereof, and is secured by way of the ring member 88 by means of the nut 89.

The drive of the rear wheels 43 is accomplished by transverse drive shafts 62 which in turn are driven from a differential gear 63 fastened to the axle 42 and disposed, for instance, in an opening thereof. The differential gear 63 is driven over a drive shaft 64 by a drive aggregate or unit 65 which is arranged between the front axle 18 and the rear axle 42. The drive aggregate 65 is appropriately provided with horizontally disposed cylinders and is preferably located in the region of the center of gravity of the loaded vehicle whereby an especially favorable distribution of the weight is attained.

The steering of the vehicle takes place from the driver's seat, which is located directly at the front end of the vehicle, over the steering gear 66 and the steering rods 67 and 68 which are arranged in series. The steering rods 67 and 68 are connected with each other by an intermediate lever 69 which is disposed in a plane containing, for instance, the frame joints 23, 24 and 25 of the guide links 20, 21 and 22, respectively, of the front axle 18 and thereby provides for an unobjectionable satisfactory steering kinematic. The steering rods of the front wheels 19 may be connected with each other in the usual manner by a tie bar 70.

With a uniform spring movement or deflection of the wheels of the front axle 18 or of the rear avle 42, the guide links 20, 21 and 22, and guide links 51, 52 and 53, respectively, undergo or carry out essentially uniform swinging movements. However, for instance, if one of the front wheels 19 travels over an obstacle, then the front axle 18 may assume an inclined position with respect to the vehicle superstructure because the pivots of the guide links 20, 21 and 22 or also possible the guide links themselves suitably constructed for that purpose, for example, as torsional elements, may yield in the direction of rotation about the longitudinally extending axis as well as slightly in the transverse direction whereby the non-guiding springs 33 and 34 permit such yieldingness without difficulty. A transverse movement of the axle, that is "floating" of the vehicle body in relation to the axle is, however, prevented by the transverse guide rod 29.

The mode of operation of the rear axle suspension is similar to that of the front axle suspension, however, with the difference that the transverse forces, instead of being absorbed by a transverse guide rod or brace 29, as in connection with the front axle 18, are absorbed by the upper guide link 53 itself inasmuch as the latter is pivotally connected in a hinge-like manner at the vehicle superstructure in the form of a triangularly-shaped guide link, and thereby presents at the same time also a strong support for the rear axle 42 with respect to the vehicle superstructure in the transverse direction of the vehicle. However, a swinging movement of the axle 42 about a central longitudinal axis $m—m$ of the vehicle is also made possible in this case as a result of the universal joint connection in joint 61 between guide link 53 and rear axle 42. Moreover, as a result of the relatively high disposition of the guide link 53, a relatively great stability of the vehicle body against transverse oscillations is obtained.

The term "superstructure" is used herein to designate the frame or chassis of a vehicle as well as those constructions of self-supporting bodies.

By means of the invention above described, applicant has provided an advantageous construction in which the front axle as well as the rear axle of the vehicle are preferably guided in parallel or essentially in parallel relationship by quadrangular guide link arrangements. The guidance of the axle in each case takes place in an especially preferred embodiment by three guide links or arms, and more particularly by two guide links disposed on opposite sides of the vehicle of essentially the same height, preferably constituting the lower guide links, and by a third guide link arranged centrally intermediate these two lower guide links and preferably constituting the upper guide link.

While I have shown one preferred embodiment of my invention, it is understood that the same is not limited thereto but is susceptible of many changes and modifications within the scope of a person skilled in the art, and I intend to cover all such changes and modifications as encompassed by the appended claims.

I claim:

1. An axle suspension for vehicles, comprising a rigid axle for the wheels of the vehicle, a vehicle superstructure, spring means non-guidingly supporting said superstructure on said axle, said spring means including support members engaging said axle, means pivotally connecting said superstructure to said axle and providing a guide-link quadrangle, as viewed in side view, for said axle including means enabling said axle to swing about a longitudinal vehicle axis and laterally supporting said axle against said superstructure said guide link quadrangle comprising three guide links, one of said guide links being located intermediate the other two of said three guide links and forming the upper side of said guide link quadrangle, said means pivotally connecting said superstructure to said axle further comprising flexible joints connecting one end of each of said other two guide links with said superstructure and further flexible joints connecting the other end of each of said other two guide links to one of said support members.

2. An axle suspension for large type vehicles provided with a rigid front axle and a rigid rear axle for the wheels of the vehicle and with a vehicle superstructure, comprising spring means non-guidingly supporting said superstructure on said axles, means provided with guide links pivotally connecting said superstructure to said axles and providing a guide-link quadrangle, as viewed in side view, for each said axle to guide the same essentially parallelly including means enabling said axles to swing about a longitudinal vehicle axis and means including resilient means for laterally supporting said axles against said superstructure, said vehicle superstructure comprising longitudinally extending frame members and at least one transversely extending frame member, bearer members secured to said longitudinally extending frame members and to said one transversely extending frame member, two of said guide links of said means pivotally connecting said superstructure to said front axle being provided with resilient connecting means to said axle and to said superstructure, one of said guide links of said means pivotally connecting said superstructure to said front axle being provided with resilient connecting means to said axle and to said bearer members, said guide links of said means pivotally connecting said superstructure to said rear axle comprising a guide link of triangular shape, means including resilient means hingedly connecting said last-named guide link to said superstructure, a universal joint connection between said last-named guide link and said axle, said resilient connecting means of said one of said last-named guide links and said universal joint connection being comprised in said means enabling said axles to swing about a longitudinal vehicle axis, said last-named resilient connecting means and said universal joint connection being disposed along said axis.

3. An axle suspension for vehicles, comprising a rigid axle for the wheels of the vehicle, a vehicle superstructure, spring means including bow-shaped support members engaging said axle non-guidingly supporting said superstructure on said axle, means having guide link means pivotally connecting said superstructure to said axle and providing a guide-link quadrangle, as viewed in side view, for said axle including mounting means enabling said axle to swing about a longitudinal vehicle axis and laterally supporting said axle against said superstructure, said guide link means comprising three guide links with one lateral guide link thereof located on each side of said vehicle and forming one side of said quadrangle and one intermediate guide link between said two lateral guide links and forming the upper side of said quadrangle, and flexible joints connecting ends of said two lateral guide links with said superstructure, and further flexible joints connecting the other ends of said two lateral guide links with said bow-shaped support members.

4. An axle suspension according to claim 3, wherein said intermediate guide link is hingedly supported at one end thereof and at the other end thereof includes a unversal joint.

5. An axle suspension according to claim 4, wherein said one end is hingedly supported at said superstructure, and wherein such universal joint is a ball and socket joint connecting said intermediate guide link with said axle.

6. An axle suspension according to claim 3, wherein said intermediate guide link is fork-shaped at one end thereof, and bearing means hingedly supporting said fork-shaped end in said superstructure including bearing pin means inserted into the prongs of said forked end and extending into said superstructure, and rubber bearing means supporting said bearing pin means in said superstructure, and a universal joint connection between another end of said intermediate guide link and said axle, said universal joint connection being located above said axle.

7. An axle suspension according to claim 3, further comprising joint means connecting said intermediate guide link with said axle including a ball member, an outer member spherically shaped at the inside thereof, and a rubber bushing inserted between said ball member and said outer member.

8. An axle suspension for vehicles comprising a rigid front axle and a rigid rear axle, a vehicle superstructure, spring means non-guidingly supporting said superstructure on said axles, guide link means pivotally connecting said superstructure to said axles and providing a guide link quadrangle, as viewed in side view, for said axles including means enabling said axles to swing about a longitudinal vehicle axis and means for laterally supporting said axles against said superstructure, said guide link means comprising three guide links for each of said axles including one lateral guide link on each side of said vehicle and forming one side of said quadrangle and one intermediate guide link disposed between said two lateral guide links and forming the opposite side of said quadrangle, support means secured to said superstructure and extending laterally of said front axle, said intermediate guide link of said guide link quadrangle of said front axle extending between said front axle and said support means, said means enabling said front axle to swing about said longitudinal vehicle axis comprising flexible joints connecting the ends of each said lateral guide link with said axle and said superstructure and further comprising flexible joints connecting the ends of said intermediate guide link with said support means and said axle, said longitudinal axis passing through said last-named flexible joints, said intermediate guide link of said guide link quadrangle of said rear axle comprising a triangularly shaped member, means including resilient means for hingedly mounting said member on said vehicle superstructure, said means enabling said rear axle to swing about said longitudinal axis comprising a universal joint connection between said member and said rear axle, said longitudinal axis passing through said universal joint connection.

9. An axle suspension for motor vehicles comprising a vehicle superstructure, a rigid front axle with vehicle front wheels, a rigid rear axle with vehicle rear wheels, guide link means for each of said axles, each guide link means forming a quadrangle in side view and comprising three guide links disposed lengthwise of the vehicle, and connecting one of said axles with the vehicle superstructure, two of said guide links of each of said guide link means facing each other at opposite sides of the vertical central longitudinal plane of the vehicle and forming one side of said quadrangle, the third guide link forming the opposite side of said quadrangle, in side view, said guide link means guiding the axles up and down in vertical directions with respect to the vehicle superstructure, a drive mechanism located nearer to the rear axle than to the front axle and supported on the vehicle superstructure, means for the drive of the rear wheels by said drive mechanism, one helical spring between the front axle and the vehicle superstructure on each side of the vehicle and two helical springs between the rear axle and the vehicle superstructure on each side of the vehicle.

10. An axle suspension according to claim 9, wherein said drive mechanism is located approximately in the center of gravity of the vehicle when loaded.

11. An axle suspension according to claim 9, including means associated with said front and rear axles for preventing lateral yielding, on one hand, and allowing a swinging of said axles about the mid-longitudinal axis of the vehicle, on the other hand.

12. An axle suspension according to claim 11, wherein said guide link means for the front axle comprises at least one diagonally located support member, connecting said front axle with the vehicle superstructure, and at least partially yielding joints at the ends of said guide links facing each other, and wherein said guide link means for the rear axle comprises a hinge connecting one of said guide links with the vehicle superstructure, and a universal joint between said one of said guide links and the rear axle.

13. An axle suspension for vehicles, according to claim 9, wherein said vehicle superstructure is provided with a cross member, and wherein said springs between the front axle and the vehicle superstructure abut at one end thereof directly against said axle and the other end thereof against said cross member and wherein said front axle is provided with steerable wheels.

14. An axle suspension for vehicles according to claim 13, further comprising means for steering said steerable wheels including a steering gear disposed at a relatively larger distance from said axle, two steering rods connected in series, and an intermediate lever journaled at said superstructure approximately in the same vertical plane as the pivotal connection of the axle guide links to said superstructure for connecting together said two steering rods.

15. A axle suspension for vehicles according to claim 9, wherein said rear wheels are twin wheels and, further comprising an additional spring within at least some of said helical springs.

16. An axle suspension for vehicles according to claim 9, further comprising two bow-shaped beam-like support members secured to said rear axle on opposite sides thereof, said bow-shaped support members extending at least in part around said wheels, said two helical springs between the rear axle and the vehicle superstructure on each side of the wheels abutting at one end thereof against said bow-shaped support members, said guide link means for said rear axle including means enabling said rear axle to swing about a longitudinal vehicle axis and laterally supporting said axle against said superstructure.

17. An axle suspension for vehicles according to claim 16, wherein said superstructure includes frame longitudinal members and at least one cross member, and wherein said cross member reinforces said longitudinal frame members in the plane of the pivotal connection of the guide links at said superstructure.

18. An axle suspension according to claim 9, wherein said two of said guide links form the lower side of said quadrangle, and wherein said third guide link forms the upper side of said quadrangle.

19. An axle suspension for vehicles, comprising a rigid axle for the wheels of the vehicle, a vehicle superstructure, spring means non-guidingly supporting said superstructure on said axle, means having guide-link means pivotally connecting said superstructure to said axle and providing a guide-link quadrangle, as viewed in side view, for said axle including mounting means enabling said axle to swing about a longitudinal vehicle axis and laterally supporting said axle against said superstructure, said guide link means comprising three guide links with one lateral guide link thereof located on each side of said vehicle and forming one side of said quadrangle and one intermediate guide link between said two lateral guide links and forming another side of said quadrangle, said intermediate guide link being fork-shaped at one end thereof, and bearing means hingedly supporting said fork-shaped end in said superstructure including bearing pin means inserted into the prongs of said forked end and extending into said superstructure, and rubber bearing means supporting said bearing pin means in said superstructure, said bearing pin means including a portion for insertion thereof into said fork-shaped end, a bushing non-rotatably mounted thereon, and a bolt means securing said pin means in the axial direction thereof.

20. An axle suspension for vehicles, comprising a rigid axle for the wheels of the vehicle, a vehicle superstructure, spring means non-guidingly supporting said superstructure on said axle, means having guide-link means pivotally connecting said superstructure to said axle and providing a guide-link quadrangle, as viewed in side view, for said axle including mounting means enabling said axle to swing about a longitudinal vehicle axis and laterally supporting said axle against said superstructure, said guide-link means comprising three guide links with one lateral guide link thereof located on each side of said vehicle and forming one side of said quadrangle and one intermediate guide link between said two lateral guide links and forming another side of said quadrangle, said intermediate guide link being fork-shaped at one end thereof, and bearing means hingedly supporting said fork-shaped end in said superstructure including bearing pin means inserted into the prongs of said forked end and extending into said superstructure, and rubber bearing means supporting said bearing pin means in said superstructure, said bearing pin means including a portion for insertion thereof into said fork-shaped end, a bushing non-rotatably mounted thereon, and a bolt means securing said pin means in the axial direction thereof, said pin means being resiliently and rotatably supported in said superstructure by said rubber bearing means which consist of two rubber bumpers arranged with respect to each other V-shaped in cross section.

21. An axle suspension for vehicles, comprising a rigid axle for the wheels of the vehicle, a vehicle superstructure, spring means non-guidingly supporting said superstructure on said axle, means having guide-link means pivotally connecting said superstructure to said axle and providing a guide-link quadrangle, as viewed in side view, for said axle including mounting means enabling said axle to swing about a longitudinal vehicle axis and laterally supporting said axle against said superstructure, said guide-link means comprising three guide links with one lateral guide link thereof located on each side of said vehicle and forming one side of said quadrangle and one intermediate guide link between said two lateral guide links and forming another side of said quadrangle, said intermediate guide link being fork shaped at one end thereof, and bearing means hingedly supporting said fork-shaped end in said superstructure including bearing pin means inserted into said superstructure extending into the prongs of said forked end, and rubber bearing means supporting said bearing pin means in said prongs, said bearing pin means including a portion for insertion thereof into said superstructure, a bushing non-rotatably mounted thereon, and a bolt means securing said pin means in the axial direction thereof.

22. An axle suspension for vehicles, comprising axle means for at least one wheel of the vehicle, a vehicle superstructure including longitudinal frame members, spring means supporting said superstructure on said axle, a guide link member, means for pivotally connecting said guide link member with said axle means, support means including bearing pin means arranged coaxially with each other for hingedly connecting said guide link member at the laterally opposite sides thereof with said frame members, each of said support means comprising, means for rigidly connecting one portion of said bearing pin means with said guide link member and further comprising another portion connected to one of said frame members, said other portion including resilient bushing means arranged between said pin means and a respective one of said frame members, and bolt means securing said bearing pin means in the axial direction thereof.

23. An axle suspension for vehicles, comprising a rigid axle for the wheels of the vehicle, a vehicle superstructure, spring means non-guidingly supporting said superstructure on said axle, means having guide link means pivotally connecting said superstructure to said axle and providing a guide-link quadrangle, as viewed in side view, for said axle including mounting means enabling said axle to swing about a longitudinal vehicle axis and laterally supporting said axle against said superstructure, said guide link means comprising three guide links with one lateral guide link thereof located on each side of said vehicle and forming one side of said quadrangle and one intermediate guide link between said two lateral guide links and forming the upper side of said quadrangle, said intermediate guide link yieldingly connecting said superstructure with said axle, said means for laterally supporting said axle against said superstructure including a transverse link pivotally connecting said superstructure with said axle, said guide links and said transverse link being interchangeably identical.

24. An axle suspension according to claim 23, wherein the pivotal connection of said guide links and of said transverse link are formed interchangeably alike.

References Cited in the file of this patent

UNITED STATES PATENTS

| | | |
|---|---|---|
| 1,919,670 | Roos | July 25, 1933 |
| 2,182,249 | Chayne | Dec. 5, 1939 |
| 2,234,025 | Dellert | Mar. 4, 1941 |
| 2,300,844 | Olley | Nov. 3, 1942 |
| 2,367,817 | Brown | Jan. 23, 1945 |
| 2,589,820 | Konchan | Mar. 18, 1952 |
| 2,669,315 | Butterfield | Feb. 16, 1954 |
| 2,686,061 | Johnson et al. | Aug. 10, 1954 |
| 2,801,865 | Katzung | Aug. 6, 1957 |
| 2,819,105 | Behnke | Jan. 7, 1958 |